United States Patent
Thomas et al.

(10) Patent No.: US 10,853,271 B2
(45) Date of Patent: Dec. 1, 2020

(54) SYSTEM ARCHITECTURE WITH QUERY BASED ADDRESS TRANSLATION FOR ACCESS VALIDATION

(71) Applicant: Arm Limited, Cambridge (GB)

(72) Inventors: Tessil Thomas, Cambridge, MA (US); Jamshed Jalal, Austin, TX (US); Andrea Pellegrini, Austin, TX (US); Anitha Kona, Austin, TX (US)

(73) Assignee: Arm Limited, Cambridge (GB)

( * ) Notice: Subject to any disclaimer, the term of this patent is extended or adjusted under 35 U.S.C. 154(b) by 174 days.

(21) Appl. No.: 16/053,899

(22) Filed: Aug. 3, 2018

(65) Prior Publication Data
US 2020/0042463 A1 Feb. 6, 2020

(51) Int. Cl.
*G06F 12/14* (2006.01)
*G06F 12/1081* (2016.01)
*G06F 13/42* (2006.01)

(52) U.S. Cl.
CPC ...... *G06F 12/1441* (2013.01); *G06F 12/1081* (2013.01); *G06F 13/4221* (2013.01); *G06F 2213/0026* (2013.01)

(58) Field of Classification Search
CPC ............. G06F 12/1441; G06F 12/1081; G06F 13/4221; G06F 2213/0026
See application file for complete search history.

(56) References Cited

U.S. PATENT DOCUMENTS

| | | | | |
|---|---|---|---|---|
| 9,959,214 | B1* | 5/2018 | Habusha | G06F 12/1009 |
| 10,013,388 | B1* | 7/2018 | Wang | G06F 13/4068 |
| 2014/0115222 | A1* | 4/2014 | DeCesaris | G06F 13/4291 |
| | | | | 710/313 |
| 2016/0344731 | A1* | 11/2016 | Serebrin | H04L 63/062 |
| 2019/0179784 | A1* | 6/2019 | Tsuji | G06F 13/36 |

OTHER PUBLICATIONS

ARM Limited, "ARM AMBA 5 CHI Architecture Specification," 2014, 272 pages.*
Red Hat Customer Portal, https://access.redhat.com/documentation/en-us/red_hat_enterprise_linux/7/html/virtualization_deployment_and_administration_guide/sect-iommu-deep-dive, Nov. 12, 2015.

(Continued)

*Primary Examiner* — Tracy A Warren
(74) *Attorney, Agent, or Firm* — Leveque IP Law, P.C.

(57) ABSTRACT

An apparatus includes a first device configured to generate a transaction request targeted to a first address, a switch, coupled to the first device and configured to the route the transaction request, a port coupled to the peripheral switch and the data processing network, and a system memory management unit, coupled to the port. The system memory management unit is configured for receiving an address query for the first address from the peripheral port translating the first address to a second address, accessing attributes of a device associated with the second address and responding to the query. Access validation for the transaction request is confirmed or denied dependent upon the second address and the attributes of the device associated with the second address. The first device may be a peripheral device, the switch may be a peripheral switch and the port may be a peripheral port.

21 Claims, 5 Drawing Sheets

(56) References Cited

OTHER PUBLICATIONS

Simon Kaya, "RFC on No ACS Support and SMMUv3 Support," https://lists.linuxfoundation.org/pipermail/iommu/2017-February/020436.html, Feb. 14, 2017.

Joerg Roedel, Advanced Micro Devices, Inc., http://elixir.free-electrons.com/linux/v4.1/source/drivers/iommu/iommu.c, Free Software Society, 2007-2008.

VMware, https://kb.vmware.com/selfservice/microsites/search.do?language=en_US&cmd=displayKC&externalId=2142307, Apr. 26, 2018.

* cited by examiner

SYSTEM ARCHITECTURE WITH QUERY BASED ADDRESS TRANSLATION FOR ACCESS VALIDATION

BACKGROUND

Peripheral Component Interconnect Express (PCIe) is a standard for high-speed serial expansion buses for computers. PCIe provides separate serial links that couple each end point to a root complex or host, and supports peer-to-peer communication between end points.

PCIe Access Control Services (ACS) require that a PCIe root complex or host performs access validation for peer-to-peer requests. This validation is required by operating systems and Hypervisor systems for device and function assignments, for example. Access validation typically involves requesting a system Memory Management Unit (MMU) to look up system page tables to retrieve the virtual address to physical address translation as well as to check whether the requestor of the access has permissions to read and/or write and/or execute the content of the location to which the access is requested. Access validation is designed to prevent spurious peer to peer access from one PCIe endpoint to another PCI endpoint. Access validation provides isolation between different virtual machines and between different containers. Therefore, without an access validation capability, important PCIe usage models, such as device assignment and single root input/output virtualization (SR-IOV) based function assignment cannot be enabled securely.

In a data processing network, the PCIe root complex may be attached to a processing node of the network, but access validation may be performed by a memory management unit of the network. As a result, validation requests and responses are transferred between multiple network components, resulting in increased network congestion and validation latency. However, Accordingly, there exists a need for improved access validation in a PCIe enabled data processing network.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding elements.

DETAILED DESCRIPTION

Figure 1:
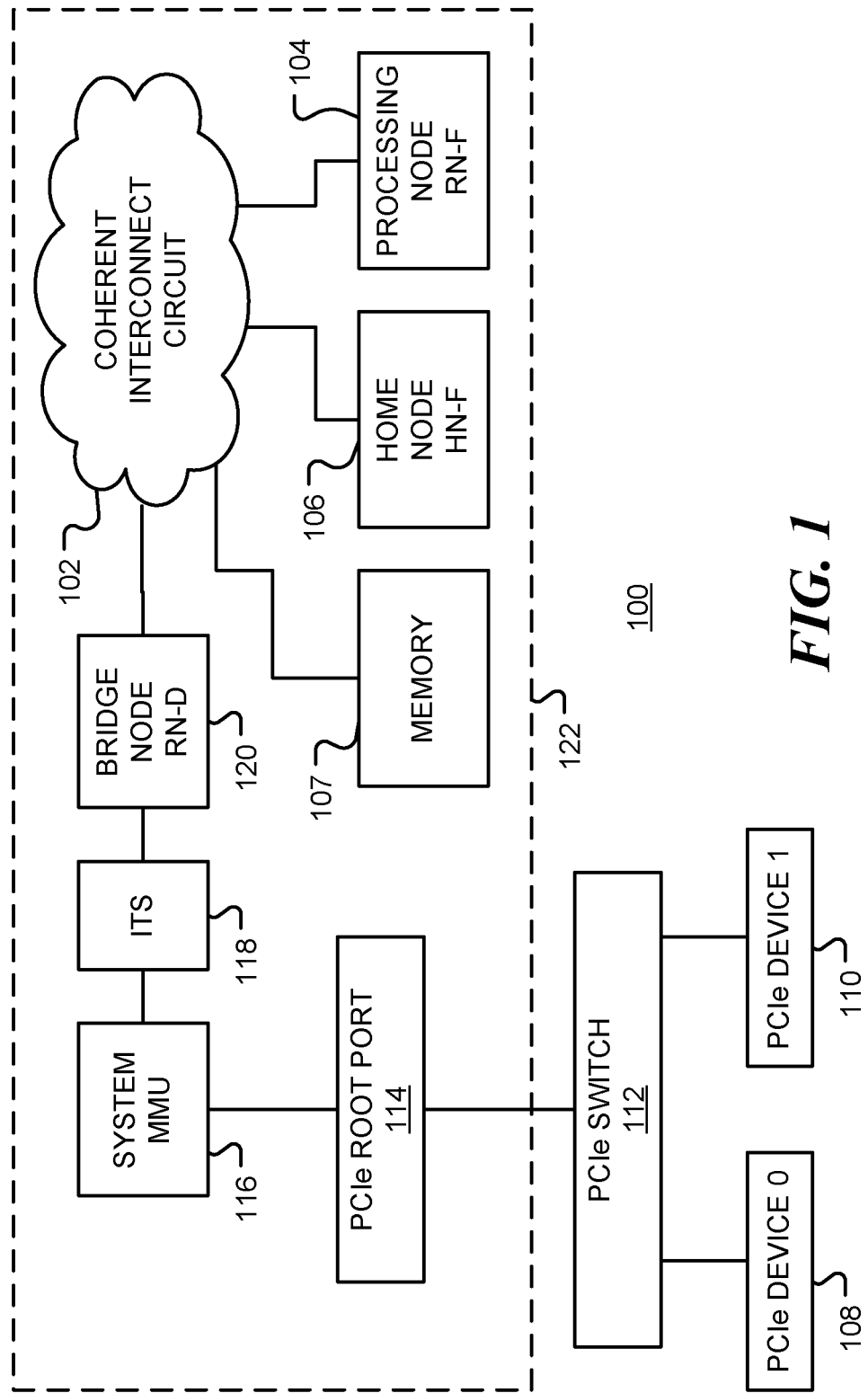
FIG. 1 is a block diagram of a conventional data processing system.

The various apparatus and devices described herein provide a mechanism for access validation in a data processing system In accordance with certain representative embodiments of the present disclosure, there is provided an improved architecture for performing access validation in a data processing system having a Peripheral Component Interconnect Express (PCIe) subsystem.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The present disclosure relates to an improved mechanism for access validation in peripheral subsystem, such as a PCIe subsystem, of a data processing network. In current data processing networks, access validation is performed using the main transaction flow of data processing network.

FIG. 1 is a block diagram of a conventional data processing system 100. The system 100 includes coherent interconnect circuit 102 that couples between a number of nodes such as processing node 104 (which may be a fully coherent request node (RN-F) for example), and home node 106

(HN-F), and to memory 107. Each processing node may include one or more processing cores. Each Home Node acts as point of coherence and serialization for a range of system addresses. A function of the Home Node is to provide address translation, such as translation between system and physical address. Data processing system may also include PCIe peripheral devices 108 and 110 that are coupled to the data processing network via PCIe switch 112, PCIe root port 114, system memory management unit (MMU) 116, interrupt translation service (ITS) circuit 118 and bridge node (RN-D) 120. PCIe communication is packet-based. PCIe switch 112 receives packets and directs them between ports based on packet heads. PCIe root port 114 implements a transaction layer of the PCIe mechanism and, for example, generates transaction requests on behalf of network nodes. Interrupt translation service (ITS) circuit 118 provides a mechanism for translating message signaled interrupts.

System MMU performs address translations and enables a virtual machine (VM) to perform direct memory access (DMA) transactions directly to and from a PCIe Endpoint. This may be done, for example, by using look-up tables to map a virtual address that the VM is accessing (reading from or writing to) to a physical location. ATS also enables a virtual machine in a PCIe endpoint, such as PCIe peripheral device 108 or 110, to perform DMA transactions to access memory 107.

In one embodiment, communication between system MMU 116 and ITS 118 is provide by an Arm® AMBA® Advanced eXtensible Interface (AXI) specified by Arm Limited, U.K. Communication between ITS 118 and bridge node 120 may also be provided by an AXI interface.

Bridge Node 120 may be coupled to coherent interconnect circuit 102 an Arm® AMBA® coherent hub interface (CHI) of Arm Limited, for example.

Various components of the data processing network may be implemented as a System on a Chip (SoC) 122. In the embodiment shown in FIG. 1, PCIe devices 108 and 110 and PCIe switch 112 are located off-chip, while the other elements are located on-chip. It will be apparent to those of ordinary skill in the art, that a SoC will contain numerous other components. These have been omitted from FIG. 1 for the sake of clarity.

Since PCIe provides a packet-based network architecture, the source and destination of each packet is known and may be used for controlling access by and to devices. PCIe provides a set of features known as Access Control Services (ACS) that may be used to provide a level of security in a PCIe network. For example, permissions validation for requests provide security between downstream components. In operation, the PCIe Access Control Service (ACS) requires that any peer-to-peer transaction between PCIe devices is re-routed to the PCIe root port for access validation. Once the PCIe root port receives a transaction message, the address must be translated and various message attributes must be checked for access validation. In the system shown in FIG. 1. this access validation is performed in the data processing network. As a result, a request message is transported to the data processing network and a response message is transported from the data processing network back to the PCIe root port. At each stage, the messages are queued and serialized and trackers are allocated. The process is complex because multiple communication protocols are used, in addition, a considerable number of resources, such as read and write buffers, are used. Still further, a significant latency is introduced as the messages traverse the system.

Figure 2:
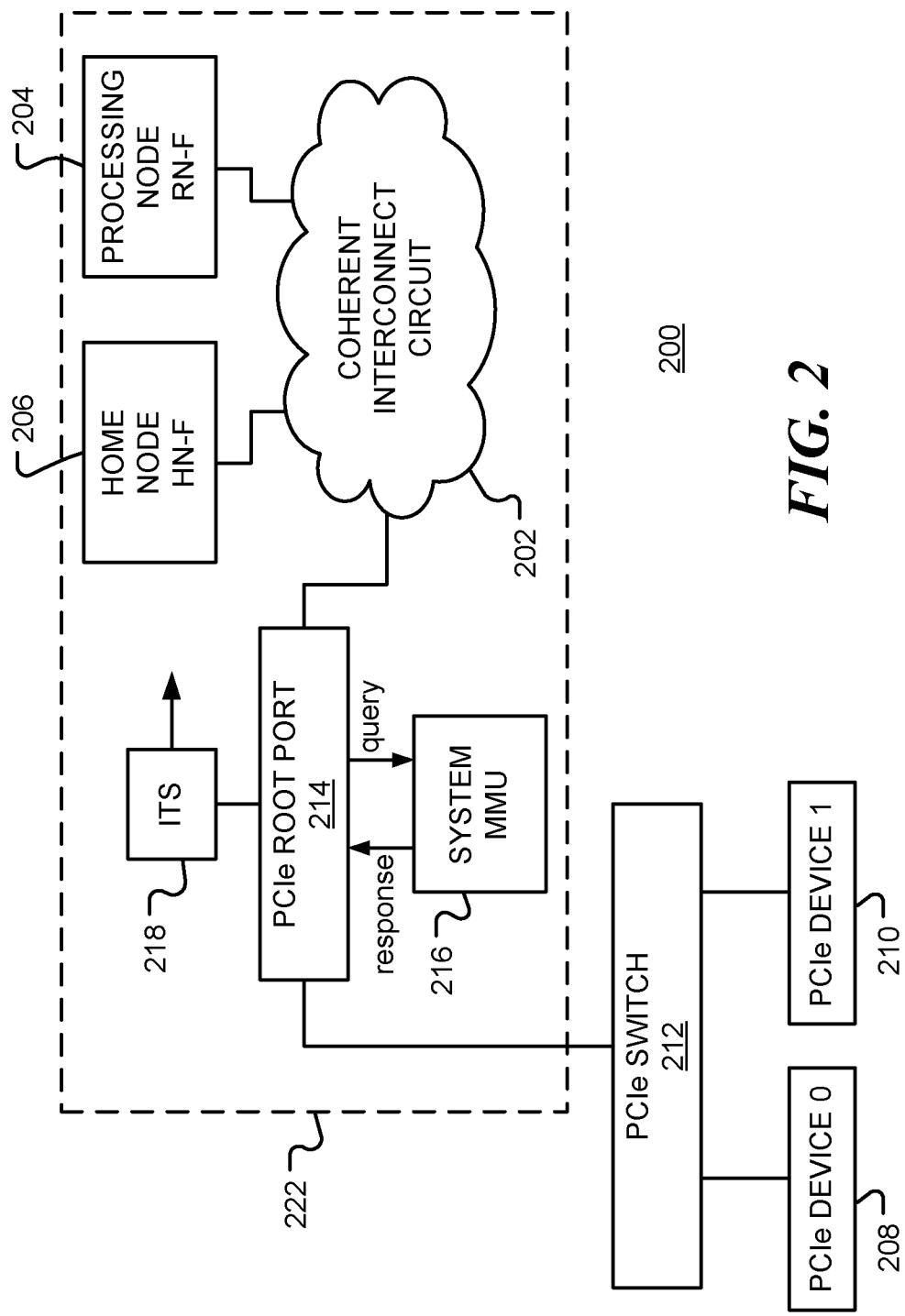
FIG. 2 is a block diagram of a data processing system consistent with various representative embodiments.

FIG. 2 is a block diagram of a data processing system 200 consistent with embodiments of the present disclosure. System 200 includes coherent interconnect circuit 202 that couples between a number of nodes such as processing node 204 (which may be a fully coherent request node (RN-F) for example), and home node 206 (HN-F). Each processing node may include one or more processing cores. Each Home Node acts as point of coherence and serialization for a range of system addresses. A function of the Home Node is to provide address translation, such as translation between system and physical address. Data processing system may also include PCIe peripheral devices 208 and 210 that are coupled to the data processing network via PCIe switch 212 and PCIe root port 214. While an embodiment of a PCIe subsystem is discussed, the disclosed mechanism may be utilized in other peripheral subsystems.

PCIe peripheral devices 208 and 210 are referred to as endpoints and act as initiators and completers of transactions.

PCIe switch 212 enables multiple devices to be attached to a single root port. The switch acts as a packet router and recognizes which path a given packet will need to take based on its address or other routing information.

PCIe root port 214 may be coupled to coherent interconnect circuit 202 an Arm® AMBA® coherent hub interface (CHI) of Arm Limited, for example. In contrast to prior architectures, no bridge node is required to couple the PCIe root port 214 coherent interconnect circuit 202.

PCIe root port 214 is also coupled to system memory management unit (MMU) 216. In accordance with an aspect of the present disclosure, system MMU 216 is configured to provide virtual address translation and memory attribute checking/resolution functions to the PCIe root port. In this way, access validation is removed from the main transaction flow path for requests generated by the PCIe subsystem. System MMU 216 provides the translated address and resolved attributes in response to a "translation query" from PCIe root port 214. In this way, most of the buffering, tracking and hazarding operations required by prior architectures are eliminated.

While a single PCIe root port is shown, other embodiments may include a root complex with multiple root ports. Each root port defines a separate hierarchy domain. Each hierarchy domain may be composed of a single Endpoint or a sub-hierarchy containing one or more switch components and endpoints.

System MMU 216 translates an input address to an output address, based on address mapping and memory attribute information available in internal registers and translation tables. An address translation from an input address to an output address is described as a stage of address translation. System MMU 216 can perform stage 1 translations that translate an input Virtual Address (VA) to an output Physical Address (PA) or Intermediate Physical Address (IPA). Optionally, system MMU 216 can perform stage 2 translations that translate an input IPA to an output PA. Stage 1 and stage 2 translations when combined translate an input VA to an output IPA, and then translate that IPA to a PA. In one embodiment, the system MMU performs translation table walks for each stage of the translation. Address translation can require multiple translation table lookups. In addition to translating an input address to an output address, a stage of address translation may also define the memory attributes of the output address. With a two-stage translation, for example, the stage 2 translation can modify the attributes defined by the stage 1 translation.

A system MMU may comprise a Translation Buffer Unit (TBU), which includes a translation look-aside buffer (TLB) for caching page tables, a Translation Control Unit (TCU)

for controlling and managing the address translations and an interconnect for connecting multiple TBUs to the TCU. The system MMU may implement a TBU for each connected master.

System 200 also includes interrupt translation service (ITS) circuit 218.

Various components of the data processing network may be implemented as a System on a Chip (SoC) 222. In the embodiment shown in FIG. 2, PCIe devices 208 and 210 and PCIe switch 212 are located off-chip, while the other elements are located on-chip. It will be apparent to those of ordinary skill in the art, that a SoC will contain numerous other components. These have been omitted from FIG. 2 for the sake of clarity.

Elements 208, 210, 212, 214 and 216 in FIG. 2 form a PCIe subsystem. However, it will be apparent to those of skill in the art that the mechanisms disclosed herein may be utilized in other peripheral subsystems for which access validation is required. More generally, PCIe devices 208 and 210 are referred to as peripheral devices, PCIe switch 212 is referred to as a peripheral switch and PCIe root port 214 is referred to as a peripheral port.

Figure 3:
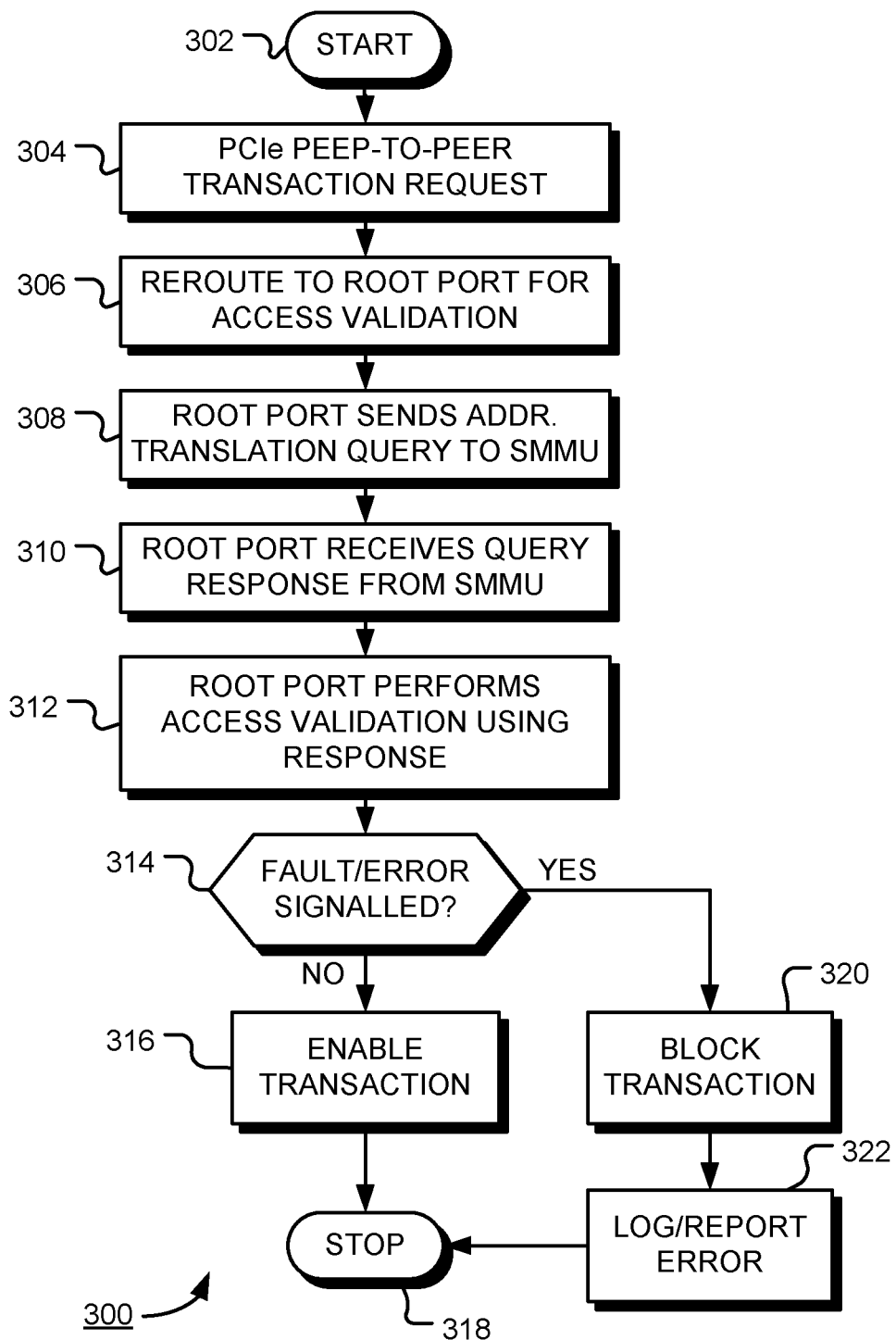
FIG. 3 is a flow chart of a method of access validation in accordance with various representative embodiments.

FIG. 3 is a flow chart of a method 300 of access validation in accordance with embodiments of the invention. The method utilizes the architecture shown in FIG. 2 and discussed above. Following start block 302, a PCIe transaction request is issued at block 304 by a PCIe device in a PCIe subsystem of a data processing system. At block 306, the request is re-routed in the PCIe switch to a PCIe root port. For every transaction coming in from the PCIe link that needs an address translation/and or attribute resolution or protection checking, the PCIe root port can request for an address translation to the system MMU via an "address translation query" interface. Thus, upon receiving the request, the PCIe root port sends an address translation query to a system MMU coupled to the PCI root port at block 308. At block 310, the PCIe root port receives a response to the query from the system MMU. For a successful query, the response will include the translated address as well any resolved attributes. Otherwise the system MMU can signal fault/error conditions. At block 312, the PCIe root port performs access validation using the response given by the MMU for the address translation query that the Root port sends for the access. For peer-to-peer transactions, when the access is validated, i.e. the requestor is permitted to access the destination location and the destination address is valid, no error is signaled, as depicted by the negative branch from decision block 314, the requested transaction is enabled and forwarded to the target endpoint at block 316, and the method terminates at block 318. If the access is not validated, or some other fault or error is signaled, as depicted by the positive branch from decision block 314, the transaction is blocked at block 320 and an error is logged or reported at block 322. The method terminates at block 318. The method shown in FIG. 3 enables access validation to be performed with further resources and less latency than previous methods.

Figure 4:
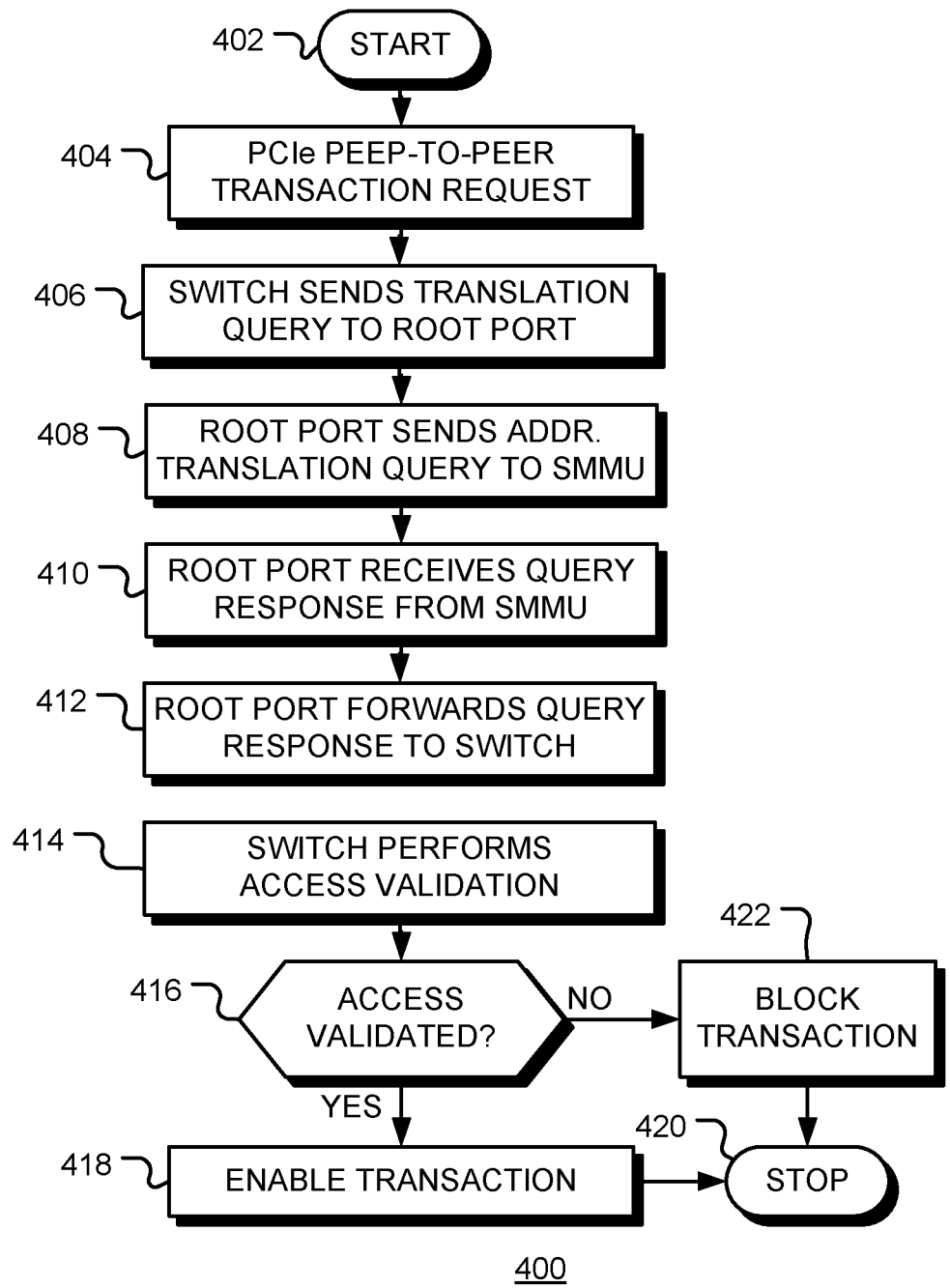
FIG. 4 is a flow chart of a further method of access validation in accordance with various representative embodiments.

FIG. 4 is a flow chart of a further method 400 of access validation in accordance with embodiments of the invention. This method also utilizes the architecture shown in FIG. 2 and discussed above. Following start block 402, a PCIe transaction request is issued at block 404 by a PCIe device in a PCIe subsystem of a data processing system. At block 406, the PCIe switch sends an address translation query to the PCIe root port. Upon receiving the quest from the switch, the PCIe root port sends an address translation query to the system MMU coupled to the PCI root port at block 408. At block 410, the PCIe root port receives a response to the query from the system MMU. For a successful query, the response will include the translated address as well any resolved attributes. Otherwise the system MMU can signal fault/error conditions. At block 412, the PCIe root port forward the response to the PCIe switch. At block 414, the PCIe switch performs the access validation using the translated address. The access validation may include checking attributes of the transaction (such as source and receiver attributes). For peer-to-peer transactions, if the access is validated, as depicted by the positive branch from decision block 416, the requested transaction is enabled at block 418, and the method terminates at block 420. If the access is not validated, as depicted by the negative branch from decision block 416, the transaction is blocked at block 422 and the method terminates at block 420.

The method shown in FIG. 4 enables peer to peer access validation to be performed without re-routing the access to the PCIe root port. This result is system that is less complex and has higher performance.

Figure 5:
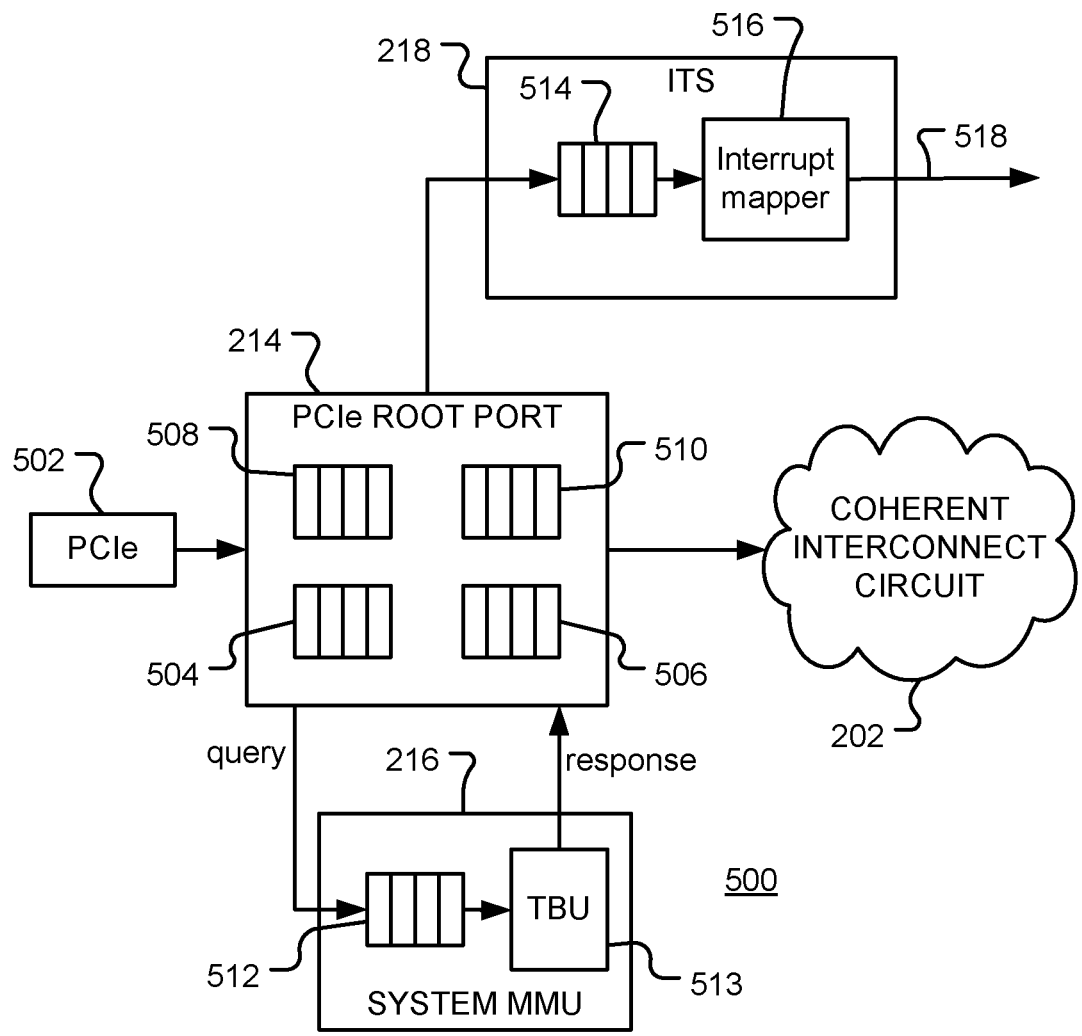
FIG. 5 is a block diagram of a PCIe access validation mechanism in accordance with various representative embodiments.

FIG. 5 is a block diagram of a PCIe access validation mechanism 500 in accordance with embodiments of the disclosure. In operation PCIe root port 214 receives messages from PCIe subsystem 502. PCIe root port 214 comprises read buffer 504, write buffer 506 in addition to tracking buffer 508 for outstanding read transactions and tracking buffer 510 for outstanding write transactions. System MMU 216 includes buffer 512 for tracking in-progress translation requests from PCIe root port 214. The translation requests are processing in translation buffer unit 513. In contrast, in prior architectures, the MMU requires read and write buffers and a tracking buffer for outstanding write operations. System MMU 216 may operate at a clock frequency that matches the translation request throughput.

Interrupt translation service (ITS) module 218 includes MSI (message signaled interrupt) buffer 514 for serializing interrupt messages, and interrupt mapper 516 that maps the signals to interrupts provided on output 518. Message Signaled Interrupts enable a PCIe device to deliver interrupts by performing memory write transactions, instead of using an line-based mechanism, for example. ITS module 218 may operate at a lower clock frequency than in prior systems, since it only needs to match the interrupt throughput, rather than, for example, data throughput.

It will be apparent to those of ordinary skill in the art, that the mechanism shown in FIG. 5 is more efficient that prior architectures, since redundant buffering, tracking and hazarding has been eliminated. In addition, the need for a bridge node has been eliminated. In addition, there is significant savings in latency in many cases, since the root port can prefetch the address translation for a given transaction coming in from end points before the PCIe ordering requirements for that transaction is met and the transaction is eligible to be forwarded into the SOC interconnect.

The peripheral subsystem disclosed above, or a component thereof, may be described by instructions of a hardware description language. Such instructions may be stored in a non-transient computer readable medium, for example. Such components may be combined with other components to form one or more integrated circuits.

Similarly, the peripheral subsystem disclosed above, or a component thereof, may be described by a netlist stored in a non-transient computer readable medium, for example.

The peripheral subsystem disclosed above may be implemented by a state machine that has no stored program instructions, or in one or more application specific integrated circuits (ASICs), in which each function or some combinations of certain of the functions are implemented as custom logic. Of course, a combination of the two approaches could be used.

Thus, methods and means for access validation in a peripheral subsystem been described herein. Further, it is expected that one of ordinary skill, notwithstanding possibly significant effort and many design choices motivated by, for example, available time, current technology, and economic considerations, when guided by the concepts and principles disclosed herein will be readily capable of implementing the methods and means with minimal experimentation.

Accordingly, some aspects and features of the disclosed embodiments are set out in the following numbered items:

1. A method for access validation in a peripheral subsystem of a data processing network, the method comprising: receiving a transaction request from a first peripheral device, the request targeted to a first address; responsive to the transaction request, sending an address query to a system memory management unit for the first address; receiving, from the system memory management unit, a response comprising a second address, translated from the first address, and attributes associated with a device associated with the second address; and confirming or denying access validation for the transaction request dependent upon the second address and the attributes associated with the device associated with the second address.

2. The method of item 1, where the transaction request comprises a message packet, and where receiving the transaction request from the first peripheral device comprises receiving the transaction request at a packet switch of the peripheral subsystem.

3. The method of item 2, where the packet switch is coupled to the data processing network through a peripheral port of the peripheral subsystem and where sending the address query to the system memory management unit for the first address comprises: routing the transaction request to the peripheral port; and the peripheral port sending the address query the system memory management unit.

4. The method of item 2, where the packet switch is coupled to the data processing network through a peripheral port of the peripheral subsystem and where sending the address query to the system memory management unit for the first address comprises: the packet switch sending the address query to the peripheral port; and the peripheral port forwarding the address query the system memory management unit.

5. The method of item 1, where the device associated with the second address comprises a device of the data processing network, the method further comprising: forwarding the transaction request to the device of the data processing network when access validation is confirmed.

6. The method of item 1, where the device associated with the second address comprises a second peripheral device coupled to the first peripheral device via a switch and where the transaction request comprises a peer-to-peer communication, the method further comprising: forwarding the transaction request to the second peripheral device when access validation is confirmed.

7. The method of item 1, where the device at the first address comprises a second peripheral device, where the first and second peripheral devices are coupled to the data processing network via a Peripheral Component Interface express (PCIe) switch and a PCIe root port of the peripheral subsystem, and where sending the address query to the system memory management unit for the first address is performed by the PCIe root port.

8. The method of item 1, where the requested transaction is subject to a PCIe ordering requirement and where the address query is sent to the system memory management unit for the first address before the PCIe ordering requirement is met.

9. The method of item 1, where the transaction request comprises a second read request received subsequent to a first read request, the method further comprising: processing the second read request prior to processing the first read request when the response from system memory management unit for the second read request is received prior to a response from system memory management unit for the first read request.

10. A peripheral subsystem for a data processing network, the peripheral subsystem comprising: a first peripheral device configured to generate a transaction request targeted to a first address; a peripheral switch, coupled to the first peripheral device and configured to the route the transaction request; a peripheral port coupled to the peripheral switch and the data processing network; and a system memory management unit, coupled to the peripheral port; where the system memory management unit is configured for: receiving an address query for the first address from the peripheral port; translating the first address to a second address; accessing attributes of a device associated with the second address; and responding to the query, and where access validation for the transaction request is confirmed or denied dependent upon the second address and the attributes of the device associated with the second address.

11. The peripheral subsystem of item 10, further comprising a second peripheral device coupled to the peripheral switch, where the device associated with the second address comprises the second peripheral device.

12. The peripheral subsystem of item 10, further comprising a processing node of the data processing network, where the device associated with the second address comprises the processing node of the data processing network.

13. The peripheral subsystem of item 10, further comprising a memory of the data processing network, where the device associated with the second address comprises the memory of the data processing network.

14. The peripheral subsystem of item 10, where the peripheral subsystem comprises a Peripheral Component Interface express (PCIe) subsystem.

15. The peripheral subsystem of item 10, where: the peripheral switch is configured for routing the transaction request to the peripheral port, and the peripheral port is configured for generating the address query for the first address and sending the address query to the system memory management unit.

16. The peripheral subsystem of item 10, where: the peripheral switch is configured for generating the address query for the first address to the peripheral port and sending the address query to the peripheral port, and the peripheral port is configured for forwarding the address query to the system memory management unit.

17. The peripheral subsystem of item 10, where the peripheral port is coupled to an interconnect of the data processing via an Arm® AMBA® coherent hub interface.

18. The peripheral subsystem of item 10, further comprising an Interrupt Translation Service (ITS) circuit coupled to the peripheral port, where the ITS circuit is configured for translating message signaled interrupts into line-based interrupts.

19. The peripheral subsystem of item 10, further comprising the data processing network.

20. The peripheral subsystem of item 10, where the system memory management unit is configured for translating a virtual memory address to a physical memory address.

21. A non-transient computer readable medium containing instructions of a hardware description language descriptive of the peripheral subsystem of item 10.

22. A non-transient computer readable medium containing a netlist description of the peripheral subsystem of item 10.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

We claim:

1. A method for access validation in a data processing system comprising:
   receiving, at a peripheral component of the data processing system, a transaction request from a first device of a data processing system, the request targeted to a first address, the first device coupled to the data processing system via the peripheral component and the peripheral component including a peripheral port or a peripheral switch;
   responsive to receiving the transaction request, the peripheral component generating an address query for the first address;
   sending, by the peripheral component, the address query to a system memory management unit;
   receiving, by the peripheral component from the system memory management unit, a response including a second address, translated from the first address, and attributes associated with a second device, where the second device is associated with the second address; and
   confirming or denying, by the peripheral component, access validation for the transaction request dependent upon the second address and the attributes of the response, and
   forwarding, by the peripheral component, the transaction request to the second device when access validation is confirmed.

2. The method of claim 1, where the peripheral switch is a packet switch, where the transaction request includes a message packet, and where said receiving the transaction request from the first device includes receiving the transaction request at the packet switch.

3. The method of claim 1, where the peripheral switch is coupled to the data processing system through the peripheral port and where sending the address query to the system memory management unit for the first address includes:
   routing the transaction request to the peripheral port; and
   the peripheral port sending the address query the system memory management unit.

4. The method of claim 1, where the peripheral switch is coupled to the data processing system through the peripheral port and where sending the address query to the system memory management unit for the first address includes:
   the packet peripheral switch sending the address query to the peripheral port; and
   the peripheral port forwarding the address query the system memory management unit.

5. The method of claim 1, where the device associated with the second address is a device of the data processing system.

6. The method of claim 1, where the first device is a first peripheral device, where the device associated with the second address is a second peripheral device coupled to the first peripheral device via the peripheral switch and where the transaction request is a peer-to-peer communication, the method further comprising:
   forwarding the transaction request to the second peripheral device when access validation is confirmed.

7. The method of claim 1, where the peripheral switch is a Peripheral Component Interface express (PCIe) switch, where the peripheral port is a PCIe root port, where the first device is a first peripheral device, where the device at the first address is a second peripheral device, where the first and second peripheral devices are coupled to the data processing system via the PCIe switch and the PCIe root port, and where sending the address query to the system memory management unit for the first address is performed by the PCIe root port.

8. The method of claim 1, where the requested transaction is subject to a Peripheral Component Interface express (PCIe) ordering requirement and where the address query is sent to the system memory management unit for the first address before the PCIe ordering requirement is met.

9. The method of claim 1, where the transaction request includes a second read request received subsequent to a first read request, the method further comprising:
   processing the second read request prior to processing the first read request when the response from system memory management unit for the second read request is received prior to a response from system memory management unit for the first read request.

10. An apparatus comprising:
    a first device configured to generate a transaction request targeted to a first address;
    at least two peripheral components including:
       a switch, coupled to the first device and configured to the route the transaction request; and
       a port coupled to the switch and a data processing network; and
    a system memory management unit, coupled to the port, the system memory management unit configured for:
       receiving an address query for the first address from the port;
       translating the first address to a second address;
       accessing attributes of a device associated with the second address; and
       responding to the query,
    where a first peripheral component of the at least two peripheral components is configured for generating an address query for the first address, and
    where access validation for the transaction request is confirmed or denied, by the first peripheral component, dependent upon the second address and the attributes of the device associated with the second address.

11. The apparatus of claim 10, where the first device is a first peripheral device, the apparatus further comprising a second peripheral device coupled to the switch, where the device associated with the second address is the second peripheral device.

12. The apparatus of claim 10, further comprising a processing node of the data processing network, where the device associated with the second address includes the processing node of the data processing network.

13. The apparatus of claim 10, further comprising a memory of the data processing network, where the device associated with the second address includes the memory of the data processing network.

14. The apparatus of claim 10, where the apparatus includes a Peripheral Component Interface express (PCIe) subsystem.

15. The apparatus of claim 10, where the switch is a peripheral switch and the port is a peripheral port, and where:
 the peripheral switch is configured for routing the transaction request to the peripheral port, and
 the peripheral port is configured for generating the address query for the first address and sending the address query to the system memory management unit.

16. The apparatus of claim 10, where:
 the switch is configured for generating the address query for the first address to the port and sending the address query to the port, and
 the port is configured for forwarding the address query to the system memory management unit.

17. The apparatus of claim 10, where the port is a peripheral port configured for coupling to an interconnect of the data processing via an Arm® AMBA® coherent hub interface.

18. The apparatus of claim 10, further comprising an Interrupt Translation Service (ITS) circuit coupled to the port, where the ITS circuit is configured for translating message signaled interrupts into line-based interrupts.

19. The apparatus of claim 10, further comprising the data processing network.

20. The apparatus of claim 10, where the system memory management unit is configured for translating a virtual memory address to a physical memory address.

21. The apparatus of claim 1 where:
 first device is a first peripheral device; and
 the peripheral port is a peripheral root port.

\* \* \* \* \*